United States Patent [19]

Haden

[11] 4,455,476

[45] Jun. 19, 1984

[54] ELECTRIC KETTLE WITH INDEPENDENTLY DETACHABLE SUBASSEMBLIES

[75] Inventor: Denis H. Haden, Staffordshire, England

[73] Assignee: D. H. Haden Limited, United Kingdom

[21] Appl. No.: 323,627

[22] Filed: Nov. 20, 1981

[30] Foreign Application Priority Data

Dec. 19, 1980 [GB] United Kingdom ................. 8040831
Jun. 27, 1981 [GB] United Kingdom ................. 8119893

[51] Int. Cl.³ .................... F27D 11/02; H05B 1/02; H05B 3/82
[52] U.S. Cl. .................................. 219/328; 219/331; 219/437; 219/441; 219/494
[58] Field of Search ............... 219/328, 330, 331–332, 219/335, 337, 437, 441, 442, 512; 337/380, 386; 99/282

[56] References Cited

U.S. PATENT DOCUMENTS

| | | | |
|---|---|---|---|
| 2,528,191 | 10/1950 | Turner | 219/437 |
| 3,539,774 | 11/1970 | Thornton | 219/442 |
| 3,725,643 | 4/1973 | Clausse | 219/441 |
| 3,784,788 | 1/1974 | Fourny | 219/441 |
| 4,357,520 | 11/1982 | Taylor | 219/330 |
| 4,358,666 | 11/1982 | Taylor | 219/330 |
| 4,360,726 | 11/1982 | Haden | 219/437 |

FOREIGN PATENT DOCUMENTS

| | | | |
|---|---|---|---|
| 722290 | 11/1965 | Canada | 219/441 |
| 980394 | 12/1975 | Canada | 219/437 |
| 1264464 | 2/1972 | United Kingdom | 219/437 |
| 1282688 | 7/1972 | United Kingdom | 219/437 |
| 1340853 | 12/1973 | United Kingdom | 219/437 |
| 1383904 | 2/1975 | United Kingdom | 219/437 |
| 1439951 | 6/1976 | United Kingdom | 219/437 |
| 1470365 | 4/1977 | United Kingdom | 219/437 |
| 2042857 | 9/1980 | United Kingdom | 219/437 |
| 2046521 | 11/1980 | United Kingdom | 219/437 |

Primary Examiner—B. A. Reynolds
Assistant Examiner—Geoffrey S. Evans
Attorney, Agent, or Firm—Neil F. Markva

[57] ABSTRACT

A switch unit for an electric kettle or other heating apparatus which is easy to assemble and repair. The switch unit includes a steam responsive mechanism 18 which is mounted on a body 80 which is in turn mounted by an adjustable clamp 31, 35 on a head part 32 of an immersion heater 12 so that the steam responsive mechanism can be moved relative to the immersion heater 12 for alignment with a handle 11 and steam vent 33. The switch unit includes a second assembly 16 which is mounted in a socket in the heating element 12 independently of the first assembly. In a preferred embodiment the first assembly and the cover 15 are designed to allow the second assembly including the switch contacts and electrical connections to be removed from the kettle without disturbing the steam responsive meachanism 18 or the cover 15.

8 Claims, 5 Drawing Figures

ELECTRIC KETTLE WITH INDEPENDENTLY DETACHABLE SUBASSEMBLIES

FIELD OF THE INVENTION

This invention concerns improvements relating to vessels such as automatic kettles for heating liquids, which vessels are provided with an electrical immersion heater assembly and a switch assembly responsive to overheating of the electrical immersion heater assembly and to boiling of liquid in the vessel to switch off the electrical supply to the immersion heater assembly.

BACKGROUND OF THE INVENTION

It is known, for example, from the published Specification of British Patent Application No.: 7,928,416 (G.B. No. 2,036,541A) to provide a vent (hole) in an upper part of the wall of the vessel and to provide the switch assembly with a steam responsive actuating mechanism which is actuable by a bimetal device disposed adjacent to the vent so as to be subjected to steam issuing from the vessel via the vent. In this switch assembly, the electrical components, such as the switch contacts and the conductors connecting the switch contacts to the immersion heater device and to electrical input terminal pins, are located in a chamber adjacent to a head of the immersion heater device, which head extends through a lower aperture in the wall of the vessel, some distance below the vent. The electrical components are thus protected from exposure to dirt and water.

The steam responsive actuating mechanism extends a considerable vertical distance from adjacent the vent to the head, and is carried on a body of the switch assembly. This body also carries the electrical components and is mounted on the head so as to clamp a dry overload actuating mechanism to the head, so that the dry overload actuating mechanism is responsive to overheating of the immersion heater device to actuate the switch contacts. The body is an assembly comprising a vertically elongate main molding (on which the steam responsive actuating mechanism is mounted), and a carrier molding (on which the electrical components are mounted). The carrier molding can be fitted to the head to enable the immersion heater, dry overload responsive actuating mechanism and electrical components to be tested (prior to being fitted to the vessel and prior to the main molding being connected to the carrier molding).

However, some considerable skill is needed to assemble the vessel to ensure that the head is secured to the vessel in a predetermined position so as to locate the bimetal device in position adjacent the vent or hole and to locate the main molding in a position to receive an outer cover.

The skill required to assemble the vessel can be reduced by utilizing jigs to pre-align the vessel and immersion heater assembly, or by providing cooperating means on the head and vessel wall to ensure that the head is located properly prior to being secured in position, but such expedients are costly.

SUMMARY OF THE INVENTION

According to the present invention there is provided a switch means, for use with an electrical immersion heater having a head adapted to be secured to the wall of a vessel for heating liquids. Wherein the switch means comprises a steam responsive mechanism mounted on a body to form a first assembly, and a second assembly comprising a dry overload responsive actuating mechanism, a switch actuating member and a carrier. The carrier carries live and neutral electrical supply connectors, switch contacts, and conductors to connect electrically the connectors and the switch contacts with cold tails of the immersion heater. The second assembly is securable to the head of the immersion heater. The first assembly is securable to the head independently of the second assembly by clamping means. The clamping means is arranged to allow the first assembly to be rotated or moved arcuately relative to the head and the second assembly prior to being secured non-rotatably to the head. A part of the steam responsive mechanism extends to cooperate with the switch actuating member when the said part and actuating member are in predetermined mutually relative positions and in relative positions adjacent to said predetermined relative positions so as to be effective to open said contacts when the steam responsive mechanism is subjected to steam.

The clamping means preferably comprises a clamping member arranged to engage the head, for clamping the head to the wall of the vessel around an aperture provided in the wall to receive the head.

The invention also provides heater apparatus comprising the switch means of the invention and an electrical immersion heater. The immersion heater comprises a heating element secured to a head so that cold tails of the element extend through a main panel of the head. The head includes an externally threaded cylindrical portion and a peripheral flange around a junction between the main panel and the cylindrical portion. The main panel has fastener means clamping the second assembly to the main panel.

The clamping member preferably comprises an internally threaded member engageable around the cylindrical portion, and including an external flange or flanges engageable by at least one clamp abutment member connected to the body, e.g. by fasteners.

The invention also includes a vessel incorporating the heater apparatus and provides a method for assembling a vessel so as to incorporate the heater apparatus. The method includes the steps of fastening the second assembly to the main panel, inserting the immersion heater and second assembly into the vessel and inserting the cylindrical portion through a lower aperture in the wall of the vessel, locating the clamping member on the cylindrical portion and actuating the clamping member to clamp the wall between the flange and the clamping member so that a main part of the element lies in a plane parallel or nearly parallel with a bottom of the vessel. Then the body is located in a desired position relative to a steam vent in an upper part of said wall, and said plurality of fasteners are subsequently tightened to clamp the body non-rotatably in the desired position.

ADVANTAGES OF THE INVENTION

It will be readily appreciated that the invention avoids the necessity to align the element with extreme accuracy so as to enable the element to be fitted rapidly to the vessel without requiring the use of jigs or expensive means for aligning the elements, and enables the body to be located accurately and rapidly so as to be correctly aligned with the steam vent. The correct alignment of the body also factilitates the fitting of an outer cover, which latter may form part of or may engage a handle of the vessel.

Also, as compared with known switch assemblies (in which the steam responsive mechanism is mounted on a molding which carries the electrical components and the dry overload responsive actuating mechanism, or in which the steam responsive mechanism is clamped to or mounted on a member carrying the electrical components and the dry overload responsive actuating mechanism) the whole of the second assembly in the present invention is protected from working loads, shocks and forces applied to the body either directly or via the cover or handle, so as to improve the reliability of the switch means, and in particular, the long term effectiveness of the dry overload responsive actuating mechanism. Furthermore, an effective seal can be provided between the clamping means and the second assembly. The design and production of the carrier is simplified by the invention relieving the carrier of the need to register accurately with and provide mechanical support for the body.

The switch assemblies described in said Specification G.B. No. 2,036,541A and other known switch assemblies for automatic kettles have the further disadvantage that the steam responsive actuating mechanism has to be removed before or together with the rest of the assembly to provide access to the assembly to enable, for example, the switch contacts to be replaced. Therefore, and therefore the steam responsive actuating mechanism has to be repositioned as the repair is completed.

The present invention enables this disadvantage to be avoided, and accordingly the switch means is preferably further characterized by the second assembly being removable from the head without releasing the clamping means securing the first assembly to the head.

The steam responsive mechanism preferably comprises a pivotally mounted lever, and said part of the steam responsive mechanism which extends to overlie and cooperate with the switch actuating member is preferably manually detachable from or displaceable relative to the rest of the lever so as not to overlie the switch actuating member.

It will be readily appreciated that the invention avoids the necessity to re-align the first assembly with the steam vent after the second assembly has been replaced, and maintains the correct alignment of the body so as to facilitate the re-fitting of an outer cover. Furthermore, the outer cover may form part of or may engage a handle of the vessel, and the invention enables the removal of the outer cover to be avoided by utilising a removable plug socket member mounted in the said assembly.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION

Figure 1:
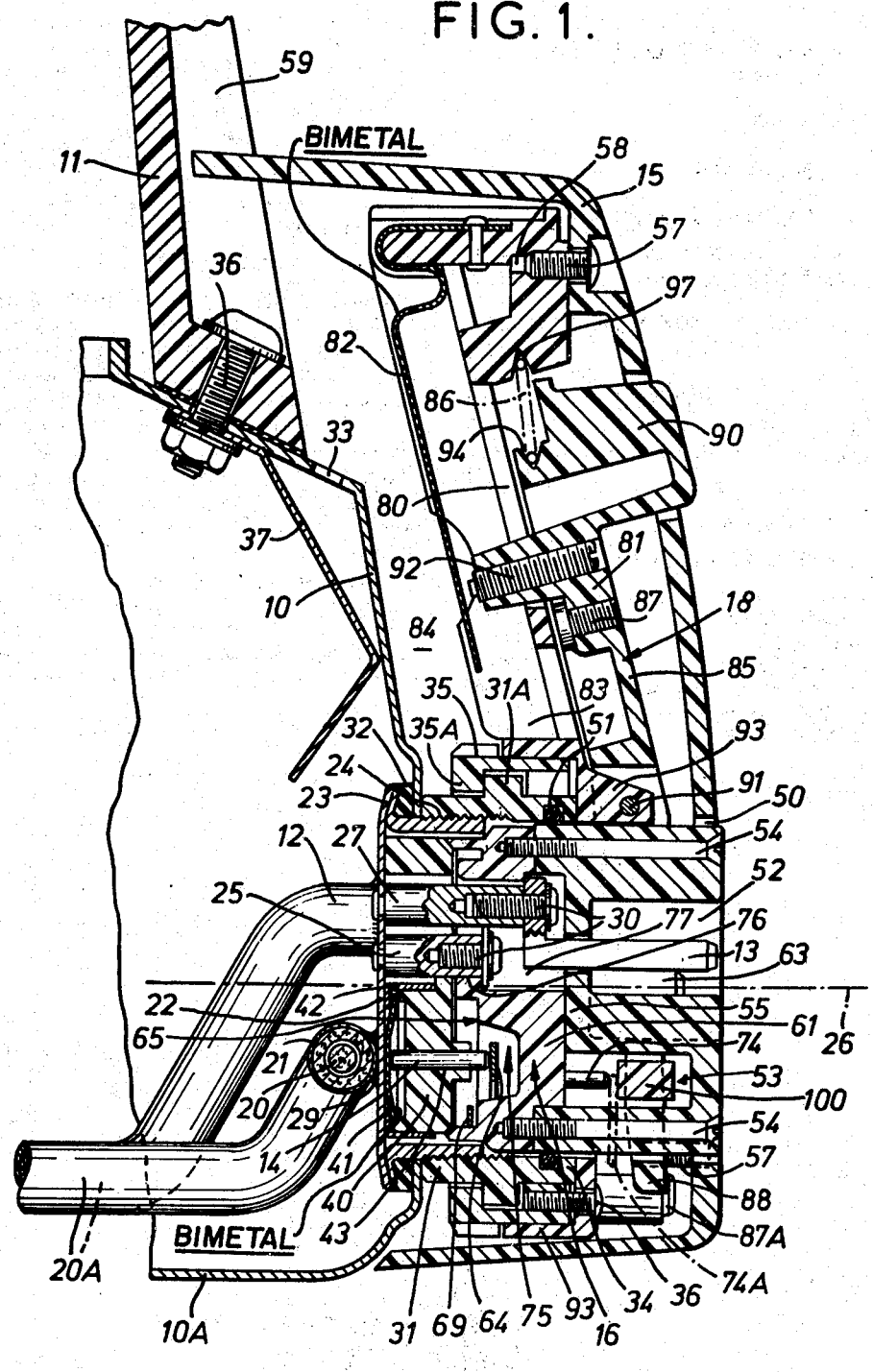
FIG. 1 is a vertical section through a portion of a vessel in the form of an electric kettle showing the heater apparatus including switch means made in accordance with the invention.

The electric kettle body has a wall 10, a handle 11, an immersion heater 12, an earth pin connector 13 and switch means. The switch means comprises a second assembly which includes a dry overload responsive mechanism 14 and an electrical connector and switch arrangement 16; and the switch means further comprises a first assembly which includes a steam responsive actuating mechanism 18. The switch means is provided with an outer cover 15 or housing.

The immersion heater 12 comprises an element 20 having a metal sheath 21; a metal head having a main panel 22, a peripheral rim flange 23 and an externally threaded cylindrical portion 24 perpendicular to the main panel; and an elongate post arrangement. The elongate post arrangement comprises a first post 25 which is secured perpendicularly to the main panel above a central axis 26 of the head, and a longer second post 27 secured to the main panel so as to be parallel with and slightly above the post 25. The free end parts of the posts are internally threaded to receive two fasteners 30 one of which clamps the earth pin connector 13 directly to the post 27. The ends of the sheath 21 are secured to the main panel so as to leave cold tails 28 of the element projecting into a socket defined by the cylindrical portion 24 and the main panel 22, and an intermediate portion of the sheath is secured across one face of the main panel to provide a hot spot 29.

The immersion heater 12 is secured in a predetermined position in the body by an internally threaded clamping member 31 which is screwed onto the portion 24 so as to clamp the rim 23 and a seal 32 to the wall 10. The second assembly may be secured in the socket prior to the immersion heater being fitted to the kettle.

In the second assembly, the dry overload responsive mechanism 14 comprises a molded member 40 of a heat resistant thermal insulating material, a bimetal 41 of stressed snap-acting dished form located on one side of the member 40 by a cylindrical flanged metal retainer 42, and a push rod 43 which extends perpendicularly from the bimetal through a cylindrical guideway through the member 40 to project from the other side of the member 40. The member 40 is apertured to provide passages through which the posts 25 and 27 and cold tails 28 extend, and to receive projections or pegs 60 of the switch arrangement 16. Said one side of the member 40 provides a flat abutment face 44 which confronts and abuts the main panel 22, and is shaped to allow the bimetal to snap from a convex dished form to a concave dished form, upon being heated to a predetermined temperature by the hot spot 29, to thrust the push rod 43 away from the hot spot.

Figure 4:
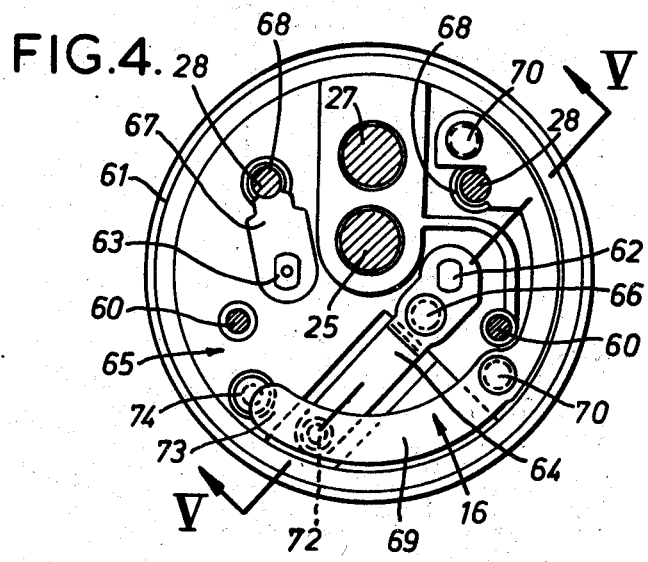
FIG. 4 is an elevational view partly in section of an internal part of the switch means in front elevation.

The electrical connector and switch arrangement 16 comprises a carrier member 61 together with a set of switch contacts, and electrical connectors mounted on the carrier member 61 as shown in FIG. 4. The connectors comprise a live electrical supply connector terminal pin 62, and a similar neutral pin 63. The pin 62 extends through the carrier member 61 and is riveted over to secure one end of a first spring connector 64 to an inside face 65 of the carrier member. Said one end is further held by a projection 66 of the carrier member. The neutral pin 63 similarly extends through the carrier member and 61 and is riveted over to secure a neutral connector 67 to the carrier member, which neutral connector has an extension which is clamped to one of the cold tails 28 by a cylindrical collar 68. A second spring connector 69 is secured to the inside face by two projections 70, and similarly has an extension which is secured to the other cold tail 28 by a further collar 68. The set of switch contacts comprises a first contact 71, mounted on a free end of the connector 64 and second contact 72 mounted on a free portion of the second spring connector 69.

Figure 5:
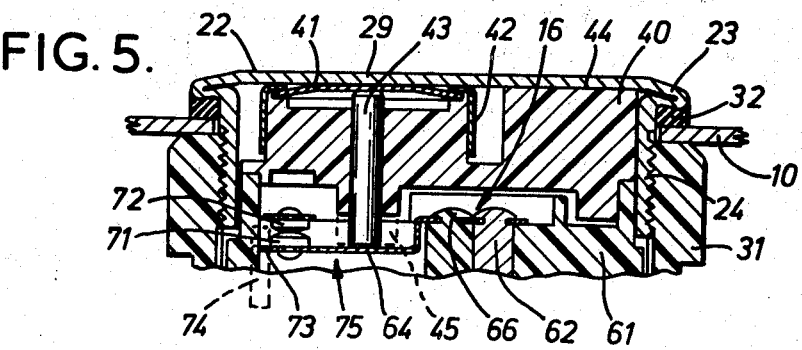
FIG. 5 is a cross-section through part of the heater apparatus along line V—V in FIG. 4.

The first connector 64 is arranged as shown in FIG. 5 so that it can be displaced by the push rod 43 to move the first contact away from the main panel so as to open the contacts, and the second spring connector 69 has an extension 73 which can be moved by an actuating member in the form of a second push rod 74 in a direction towards the main panel 22 so as to open the contacts 71 and 72.

The spring connectors 64 and 69 are arranged so that when the first contact 71 is moved outwards away from the head, the second contact 72 is prevented from following the first contact 71 for more than a slight distance by the extension 73 abutting either the push rod 74 or the mounting adjacent the push rod; and similarly when the second contact 72 is moved inwards towards the head 22, any movement of the first contact 71 is restricted by the connector 64 abutting the push rod 43, or optionally an extension 45 of the molded member 40 (shown in broken lines in FIG. 5). Furthermore the contacts 71 and 72 are caused to wipe across each other slightly during the initial part of each opening movement and the final part of each closing movement, so as to be self cleaning.

The inside face of the carrier member 61 and the other side of the molded member 40 are shaped to interengage and define therebetween a switch contact chamber 75, and the projections 60 are provided with terminal heads, after assembly, to secure together the carrier member 61 and the molded member 40. The peripheral surfaces of the member 40 and an adjacent portion of the carrier member 61 are shaped so as to be a close sliding fit in the socket, and the outside face of the carrier member 61 is provided with a recess 77 and an abutment 76 which enables the carrier member and member 40 to be clamped to the head by the second of the two fasteners 30, independently of the earth pin connector 13 which is partially accommodated in said recess 71.

The second push rod 74 of stepped cylindrical form extends through a stepped cylindrical way in the carrier member 61. A plug socket 52 is provided in a plastics member 55 to receive an electrical supply connector (not shown), for connecting to the pins 13, 62 and 63, which pins extend from the carrier member 61 through a wall of the plastic member 55. The plastic member 55 is secured to the rear or outside face of the carrier member, e.g. by screws 54, and is recessed adjacent the thrust rod 74 to provide a recess 53.

The clamping member 31 is grooved internally to receive a sealing ring 51 which engages the periphery of the plastic member 55.

In the first assembly, the steam responsive mechanism 18 is mounted on a body 80, and comprises a lever 81 and a steam responsive member in the form of a steam actuable bimetal 82. The body 80 has an upper portion 83 which extends upwards from adjacent the clamping member 31 so as to confront the wall 10 of the kettle body to define a steam space 84 therebetween. The bimetal 82 is mounted, at its upper end, on a top part of the upper portion 83 so as to depend within the steam space alongside that side of the upper portion which confronts the wall 10. The lever 81 is pivotally mounted by a pivot pin 91 upon the body, and has an upper portion 85 which lies alongside the other side of the upper portion 83. A top part of the portion 85 is engaged by a spring 86. The spring is located by the top part of the body, and is arranged so that the lever 81 is movable between a first stable position, in which an adjustable abutment 87 of the lever abuts the upper portion 83, and a second stable position, in which the abutment 87 is spaced apart from the upper portion 83. The lever 81 has a ring shaped lower portion 88 on which a detachable abutment part 100 is provided so as to be located in the recess 53. In the first position of the lever 81, the part 100 is spaced apart from the second push rod 74, and in the second position the part 100 abuts the push rod 74 so as to hold the contact 72 away from the contact 71. The lower portion 88 is of ring form and provides an opening having an internal diameter which is fractionally greater than the overall diameter of the second assembly, and a similar opening is provided in a lower portion 93 of the body 80. The plastic member 55 extends through the openings in the lower portion 88 and in the portion 93 of the body 80, as shown in FIG. 1.

The part 100 comprises a bar which extends along a chord across the lower portion 88. The ends 101 of the part 100 are press or snap fitted into sockets 102 in the portion 88 to hold the part 100 in position.

The upper portion 85 is shaped to provide a knob 90 which projects through the cover 15 to allow the lever 81 to be moved manually to the first position.

The spring 86 is of round wire formed to S or Z shape so as to have top and bottom parallel limbs which are self centering in V or U shaped confronting grooves 97, 94 in the top parts of the body 80 and lever 81, which limbs are connected by an intermediate transverse limb, and the arrangement is such that the compression on the spring 86 is increased to a maximum when the lever 81 is in an intermediate position between the first and second positions so as to urge the lever 81 out of said intermediate position.

The wall 10 has an upper steam vent or hole 33 which allows steam to pass from the kettle into the steam space 84 so as to heat the bimetal 82, whereby to cause the bimetal to bend outwards away from the wall 10 to contact an adjustable abutment 92 on the upper portion 85, which abutment extends through an aperture in the upper portion 83 into the steam space, so that the movement of the bimetal is transmitted to the lever 81 to cause the lever 81 to move to the second position via an unstable intermediate position.

The lower portion 93 of the body 80 is of ring form and is provided with a forwardly directed annular abutment surface which is adapted to be clamped to an annular abutment face on a rear end portion 34 of the clamping member 31.

The clamping member 31 forms part of clamping means, which means further comprises clamp abutment ring 35 and clamping fasteners 36. The portion 34 extends to within the ring 35 and the clamping member 31 has an external flange 31A to cooperate with an abutment flange 35A of the clamp abutment ring 35. The fasteners 36 extend through the portion 93 into the ring 35 so as to be capable of being tightened to thrust the abutment flange 35A against the flange 31A to draw the ring 35 towards the portion 93 whereby to thrust the abutment surface of the portion 93 towards and against the abutment face of the clamping member 31.

The cover 15 is mounted on the body 80 by means of fasteners 57 received in sockets 58 adjacent the upper and lower ends of the body. The cover 15 has a lower portion which defines an aperture 50 through which the plastic member 55 extends, and has an upper end portion which fits into a recess 59 in the handle 11 to conceal a fastener 36 used to secure an end of the handle and a baffle 37 to the kettle wall 10.

The vessel is assembled by assembling, and separately testing, the immersion heater, the first assembly and the second assembly. Alternatively, the immersion heater 12 and second assembly may be tested together as a unit prior to the unit being inserted into the kettle. The second assembly is then inserted into the head of the immersion heater 12 and the earth pin 31 is inserted and secured in place. The immersion heater 12 together with the second assembly is then inserted into the kettle via the opening for the lid of the kettle, and the rear parts of the second assembly and the cylindrical portion 24 of the head are inserted through the lower aperture in the wall 10 until the seal 32 abuts the wall around the aperture.

The immersion heater 12 is then held so that a major part 20A of the heater 12 lies in a plane which is substantially parallel to the bottom 10A of the kettle, and the head is secured to the wall by means of the threaded clamping member 31, after the sealing ring 51 has been located in the clamping member 31, and after the clamp abutment ring 35 has been located around the clamping member 31.

At this stage in the assembly, the immersion heater 12 is secured in a predetermined position, or in a position which is angularly close to the predetermined position, and the interior of the kettle can be inspected visually to ascertain whether or not the positioning of the immersion heater 12 is acceptable.

Thereafter, the first assembly is located so that the abutment surface on the lower portion 93 confronts the abutment face on the rear end portion 34 of the clamping member 31, and is then held while the clamping fasteners 36 are inserted into the clamp abutment ring 35. The fasteners 36 are then tightened until the clamping means supports the first assembly in such a manner that the first assembly and ring 35 can be moved arcuately relative to the clamping member 31 to allow the upper portion 83 of the body 80 to be moved precisely into a predetermined position relative to the steam vent or hole 33. The clamping fasteners 36 are then fully tightened so that the clamping means secures the first assembly rigidly to the head of the immersion heater 12 and to the wall 10 around the aperture. The plastic member 55 and the cover 15 are then located in position and secured by means of the fasteners 54 and 57.

To assist in the aligning of the first assembly, the top part of the portion 83 preferably extends so as to be locatable in the recess 59 in the handle 11, or to adjacent the fastener 36, so that the handle 17 or the fastener 36 can be used as a reference point during the arcuate movement of the first assembly about the axis 26 passing centrally through the head some considerable distance below said top part.

In use, any knocks or bumps applied to the cover 15, and the shock loads generated by the operation of the steam responsive mechanism are transmitted via the body 80 and the clamping member 31 to the wall 10 of the vessel without being imparted to the second assembly, except for the loads applied by the part 100 to the second push rod 74. Furthermore, any steam, water or condensate draining down from the steam space 84 will be allowed to drain away around the clamping member 31 and will be prevented from entering the second assembly by the sealing ring 51 and the plastic member 55.

Furthermore, the part 100 has a considerable area which is available for abutting the push rod 74, which area covers an arc about the axis 26, so that the part 100 can cooperate with the push rod 74 not only when said first and second assemblies are in their predetermined positions, but also when the second assembly is in a position which is displaced by several degrees of arc around said axis 26 away from said predetermined position so that the positioning of the immersion heater 12 is no longer critical.

In the event of the second assembly needing repair or replacement, due to damage to or a fault in the switch contacts, terminal pins, cold tail connections, or the dry overload mechanism, the second assembly can be removed through the openings in the lower portions of the body 80 and lever 81 and the aperture 50 in the cover 15, after the plastics member 55 has been removed and the part 100 pressed upwards from the sockets 102 and removed from the portion 88. The second assembly can thus be removed for repair, and subsequently replaced, without moving the cover 15 and the body 80, the latter being left in situ together with the bimetal, spring, abutments and lever 80.

The invention is not confined to the precise details of the foregoing example, and many variations are possible. For example, it is possible to substitute a plurality of flanged clamp abutment members, each of limited lengths, in place of the clamp abutment ring 35.

Furthermore, the earth pin 13 may be formed as part of the head instead of being secured to a post on the head, but the arrangement of the earth pin described is preferred because the earth pin 13 is used to centralize the plug socket connector as the latter is inserted into the plug socket.

The invention has the further advantage that the cover can be made integral with the handle, or, alternatively the cover and the plastic member 55 may be molded integrally as a single molding which can be mounted on the second assembly or the body 80. This single molding defines the socket 52.

An alternative adjustable screw abutment 87A may be employed to limit the movement of the lever 81 by engaging the portion 88, the abutment 87 being omitted.

Figure 2:
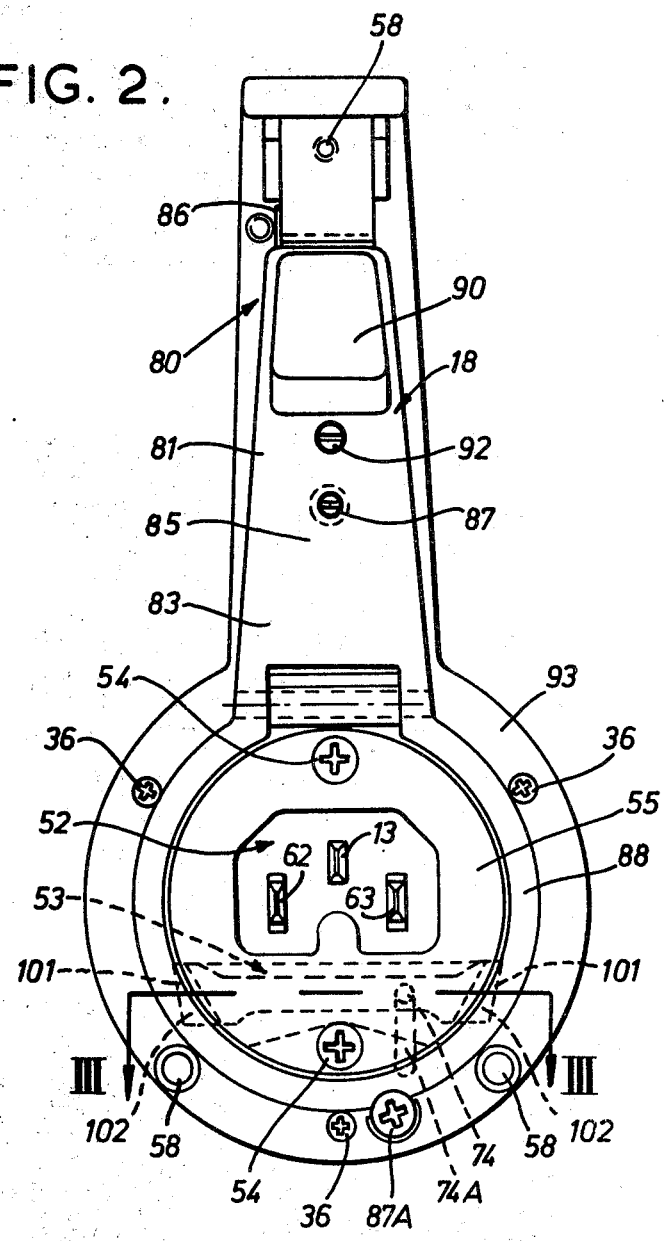
FIG. 2 is an elevational view showing the switch means in rear elevation.
Figure 3:
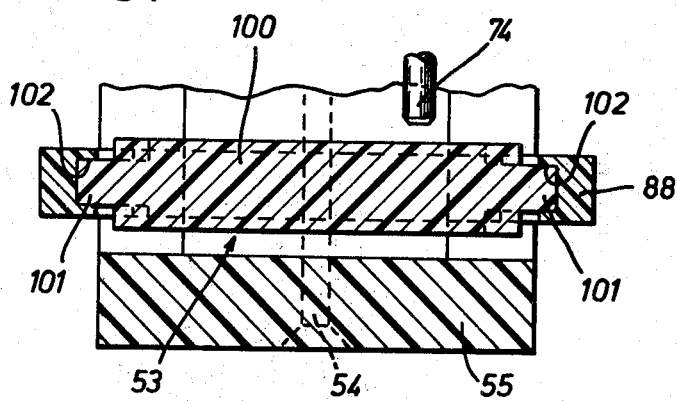
FIG. 3 is a horizontal section through the heater apparatus along line III—III in FIG. 2.

Instead of employing the detachable bar part 100, the push rod 74 may include an arm 74A (indicated in broken lines in FIG. 2) which normally depends from the push rod 74 for engagement with and displacement by the lower portion 88, the push rod 74 and arm 74A being rotatable about the axis of the rod 74 in a clockwise direction to swing the arm upwards clear of the portion 88 during removal of the second assembly.

I claim:
1. A vessel for heating liquids, comprising:
   (a) a wall, an immersion heater, and switch means,
   (b) the immersion heater having a head secured to said wall,
   (c) the switch means comprising a first assembly and a second assembly, the first assembly including a steam responsive mechanism mountd on a body means and the second assembly including a dry overload responsive actuating mechanism, a switch actuating member and a carrier, (d) the carrier carries live and neutral electrical supply connectors, switch contacts, and conductors to connect electrically the connectors and the switch contacts with cold tails of the immersion heater, (e) the second assembly is secured to the head of the immersion heater, (f) the first assembly is secured to the head independently of the second assembly by a clamping assembly, (g) the clamping assembly including means to support the first assembly for arcuate movement about a predetermined axis relative to the head and the second assembly, (h) said clamping assembly including means to secure the first assembly non-rotatably to the head, and (i) the steam responsive mechanism including a movable part which cooperates with said switch actuating member to be effective to open said contacts when the steam responsive mechanism responds to being subjected to steam.

2. A vessel as defined in claim 1 wherein
the clamping support means includes a clamping member engaging the head to clamp the head to the wall of the vessel around an aperture provided in the wall to receive the head, and
said body means includes at least one clamp abutment member which is engageable with the clamping member.

3. A vessel as defined in claim 2 wherein
the clamping member has an external flange which is engaged by the clamp abutment member,
said abutment member has an annular clamp abutment face on a rear end portion, and
said body means has a lower ring portion with a clamp abutment surface which is clamped to the clamp abutment face.

4. A vessel as defined in claim 1 wherein the body means has a lower portion which is arranged to permit the second assembly to be removed from the head without releasing the clamping assembly.

5. A vessel as defined in claim 4 wherein
said steam responsive mechanism includes a pivotally mounted lever and
said movable part of the steam responsive mechanism is detachably mounted on said pivotally mounted lever.

6. A vessel as defined in claim 4 wherein
a cover and a plastics member define a plug socket,
the cover is apertured to enable the second assembly and the plastics member to be removed without detaching the cover.

7. A vessel as defined in claim 6 wherein
the second assembly includes a cylindrical portion which extends through said wall,
the clamping assembly clamps the immersion heater to said wall of the vessel, and
said vessel includes a handle with said cover said adapted to cooperate with said handle.

8. A vessel as defined in claim 2 wherein
said immersion heater head includes a main panel,
the immersion heater includes a heating element secured to said immersion heater head,
said heating element includes cold tails which extend through said main panel of said head,
said head includes an externally threaded cylindrical portion having a peripheral flange around a junction between the main panel and the cylindrical portion,
said main panel has faster means clamping the second assembly to the main panel,
the clamping member has an external flange portion and is internally threaded to engage the externally threaded cylindrical portion of the head, and
the clamp abutment member has an internal flange engageable with said external flange portion,
said abutment member being secured to the body means by fasteners so as to hold the body means against an end of the clamping member.

* * * * *